(12) United States Patent
Doi et al.

(10) Patent No.: US 9,742,248 B2
(45) Date of Patent: Aug. 22, 2017

(54) METHOD FOR ASSEMBLING ROTOR FOR USE IN IPM ROTARY MACHINE

(71) Applicant: SHIN-ETSU CHEMICAL CO., LTD., Tokyo (JP)

(72) Inventors: Yuhito Doi, Tokyo (JP); Takehisa Minowa, Tokyo (JP); Hajime Nakamura, Tokyo (JP); Koichi Hirota, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 71 days.

(21) Appl. No.: 14/279,938

(22) Filed: May 16, 2014

(65) Prior Publication Data

US 2014/0245597 A1 Sep. 4, 2014

Related U.S. Application Data

(62) Division of application No. 12/889,835, filed on Sep. 24, 2010, now Pat. No. 8,756,793.

(30) Foreign Application Priority Data

Oct. 1, 2009 (JP) ................. 2009-229612

(51) Int. Cl.
*H02K 15/02* (2006.01)
*H02K 15/03* (2006.01)
(Continued)

(52) U.S. Cl.
CPC ........... *H02K 15/03* (2013.01); *H02K 1/2766* (2013.01); *H01F 7/0221* (2013.01); *Y10T 29/49009* (2015.01); *Y10T 29/49012* (2015.01)

(58) Field of Classification Search
CPC ............................ H02K 15/03; H02K 1/2766
See application file for complete search history.

(56) References Cited

U.S. PATENT DOCUMENTS 5,034,146 A   7/1991 Ohashi et al.
6,023,839 A   2/2000 Kinoshita et al.
(Continued)

FOREIGN PATENT DOCUMENTS

EP   2 085 982 A2   8/2009
EP   2 256 905 A1  12/2010
(Continued)

OTHER PUBLICATIONS

Lucas, Brad; "Enhancing Performance of NdFeB Magnets using the Grain Boundary Diffusion Process (GBDP) and their Effective Application", Magnetics Conference, Apr. 15-16, 2009, Chicago, IL, 27 pages.

(Continued)

*Primary Examiner* — Minh Trinh
(74) *Attorney, Agent, or Firm* — Westerman, Hattori, Daniels & Adrian, LLP

(57) ABSTRACT

A method for assembling a rotor used in connection with an interior permanent magnet (IPM) rotary machine, the rotor having an axis of rotation and comprising a rotor yoke having bores and a plurality of permanent magnet segments disposed in the bores of the rotor yoke, each permanent magnet segment consisting of a plurality of magnet pieces. The method comprises the steps of: inserting the plurality of magnet pieces in each bore of the rotor yoke, with each of the magnet pieces for each of the magnet segments being kept loose from each other, for axially stacking the magnet pieces in the bore, and fixedly securing the stacked magnet pieces in the bore of the rotor yoke.

14 Claims, 9 Drawing Sheets

(51) Int. Cl.
*H02K 1/27* (2006.01)
*H01F 7/02* (2006.01)

(56) References Cited

U.S. PATENT DOCUMENTS

| | | | |
|---|---|---|---|
| 6,262,507 | B1 | 7/2001 | Sato et al. |
| 6,633,100 | B2 | 10/2003 | Sato et al. |
| 7,262,526 | B2 | 8/2007 | Shiga et al. |
| 7,405,503 | B2 | 7/2008 | Aoyama |
| 7,948,135 | B2 | 5/2011 | Sato et al. |
| 7,950,133 | B2 | 5/2011 | Amano et al. |
| 8,020,280 | B2 | 9/2011 | Fukumaru et al. |
| 8,756,793 | B2 * | 6/2014 | Doi .............. H02K 1/2766 29/596 |
| 2003/0209950 | A1 | 11/2003 | Biais et al. |
| 2006/0278517 | A1 | 12/2006 | Machida et al. |
| 2007/0017601 | A1 | 1/2007 | Miyata et al. |
| 2007/0108861 | A1 | 5/2007 | Aoyama |
| 2008/0054736 | A1 | 3/2008 | Miyata et al. |
| 2008/0245442 | A1 | 10/2008 | Nakamura et al. |

FOREIGN PATENT DOCUMENTS

| | | |
|---|---|---|
| JP | 5-021218 A | 1/1993 |
| JP | 5-31807 B2 | 5/1993 |
| JP | 2006-261433 A | 9/2006 |
| JP | 2007-166888 A | 6/2007 |
| JP | 2007-236019 A | 9/2007 |
| JP | 2009-200179 A | 9/2009 |
| JP | 2009-254092 A | 10/2009 |
| WO | 2006/043348 A1 | 4/2006 |
| WO | 2009/116540 A1 | 9/2009 |

OTHER PUBLICATIONS

Machida, Kenichi et al.; "Grain Boundary Modification and Magnetic Properties of Nd—Fe—B Sintered Magnets" Abstract of Spring Meeting of Japan Society of Powder and Power Metallurgy, 2004, p. 202. (with English Translation).

Durst, K. D. et al., "The Coercive Field of Sintered and Melt-Spun NdFeB Magnets," Journal of Magnetism and Magnetic Materials, 68 (1987), pp. 63-75.

Park, K. T. et al., "Effect of Metal-Coating and Consecutive Heat Treatment on Coercivity of Thin Nd—Fe—B Sintered Magnets" Proceedings of the Sixteenth International Workshop on Rare-Earth Magnets and Their Applications, p. 257 (2000).

Aoyama, Yasuaki et al., "Evaluation of the Alternating Magnetic Loss in Divided Nd—Fe—B Sintered Magnet" The papers of Joint Technical Meeting on Static Apparatus and Rotating Machinery, The Institute of Electrical Engineers of Japan, SA-06-83 and RM-06-85, Aug. 25, 2006, pp. 41-46. (with English translation).

Japanese Office Action dated Mar. 26, 2013, issued in corresponding Japanese Patent Application No. 2009-229612.

Extended European Search Report dated Aug. 29, 2014, issued in corresponding European Patent Application No. 10251656.4 (9 pages).

* cited by examiner

FIG.2A
FIG.2B
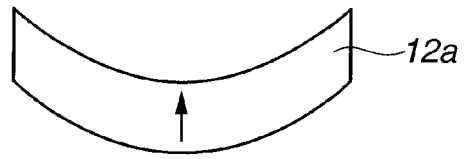
FIG.2C
FIG.3A
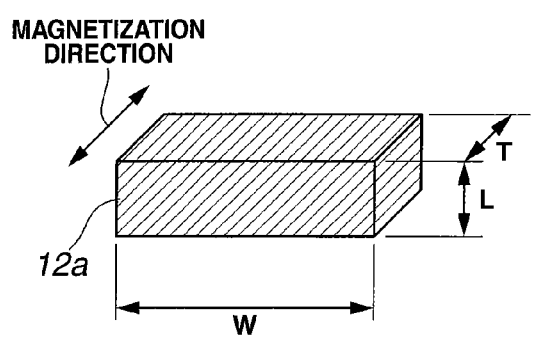
FIG.3B
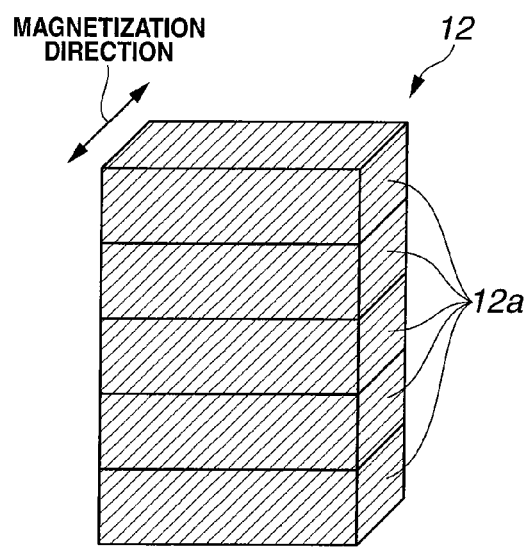

METHOD FOR ASSEMBLING ROTOR FOR USE IN IPM ROTARY MACHINE

CROSS-REFERENCE TO RELATED APPLICATION

This is a divisional application of U.S. patent application Ser. No. 12/889,835, filed on Sep. 24, 2010, now U.S. Pat. No. 8,756,793, which claims priority under 35 U.S.C. §119 (a) on patent application Ser. No. 2009-229612 filed in Japan on Oct. 1, 2009, the entire contents of which are hereby incorporated by reference.

TECHNICAL FIELD

This invention generally relates to a permanent magnet rotary machine comprising a rotor comprising a rotor yoke and a plurality of permanent magnet segments embedded in the rotor yoke and a stator comprising a stator yoke having a plurality of slots and windings therein, the rotor and the stator being disposed to define a gap therebetween, often referred to as interior permanent magnet (IPM) rotary machine. More particularly, it relates to a method for assembling the rotor. The rotor is used in a permanent magnet structure rotary machine best suited as electric vehicle motors, power generators, and factory automation (FA) motors capable of high speed rotation.

BACKGROUND ART

Sintered Nd-base magnets have a growing range of application due to their excellent magnetic properties. Also in the field of rotary machines including motors and power generators, permanent magnet rotary machines utilizing sintered Nd-base magnets were developed to meet the recent demand for size, profile and weight reductions, performance enhancement and energy saving. Since IPM rotary machines of the structure wherein magnet parts are embedded within the rotor can utilize not only the torque by magnetization of the magnet, but also the reluctance torque by magnetization of the rotor yoke, research efforts have been made thereon as high-performance rotary machines. These rotary machines have a high level of mechanical safety in that throw-out of magnet parts by centrifugal force during rotation is prohibited since magnet parts are embedded within the rotor yoke made of silicon steel sheets or the like, and are capable of high-torque operation or operation at widely varying speeds by control of current phase. They represent energy-saving, high-efficiency and high-torque motors. In these years, the IPM rotary machines find rapid widespread utilization as motors and power generators in electric vehicles, hybrid automobiles, high-performance air conditioners, industrial tools, and trains.

Permanent magnets in rotary machines are exposed to high temperature due to the heat generated by windings and yokes and have a likelihood of demagnetization by the demagnetizing field from the windings. There thus exists a demand for sintered Nd base magnets in which the coercive force which is an index of heat resistance and demagnetization resistance is above a certain level and the remanence (or residual magnetic flux density) which is an index of the magnitude of magnetic force is as high as possible.

Further, sintered Nd base magnets are conductors having an electric resistance of 100 to 200 μΩ-cm. As the rotor rotates, the magnet undergoes a variation of magnetic flux density, by which eddy currents flow. Effective means for reducing eddy currents is to divide a magnet body to interrupt the eddy current path. While division of a magnet body into smaller pieces leads to a more reduction of eddy current loss, it becomes necessary to take into account such problems as an increase of manufacturing cost and a lowering of output due to a reduction of magnet volume by increased interstices.

The eddy current path runs in a plane perpendicular to the magnetization direction of a magnet, with a higher current density prevailing in an outer peripheral portion. The current density is also higher at a side closer to the stator. That is, the amount of heat generated by eddy currents is greater near the magnet surface, so that the magnet surface region assumes a higher temperature and becomes prone to demagnetization. To suppress demagnetization by eddy currents, a sintered Nd base magnet in which the coercive force which is an index of demagnetization resistance is higher in the magnet surface region than in the magnet interior is required.

Several measures are known to improve the coercive force.

An increase in the remanence of sintered Nd base magnet is achieved by increases in the volume fraction of $Nd_2Fe_{14}B$ compound and the degree of crystal orientation, and various improvements in process have been made therefor. As to an increase in coercive force, there are known various approaches including formation of crystal grains of finer size, use of an alloy composition having an increased Nd content, and addition of an effective element. Of these, the currently most common approach is the use of an alloy composition having Dy or Tb substituted for part of Nd. By substituting such elements for Nd of $Nd_2Fe_{14}B$ compound, the compound is increased in anisotropic magnetic field as well as coercive force. On the other hand, the substitution of Dy or Tb decreases the saturation magnetic polarization of the compound. Accordingly, the attempt to increase the coercive force by the above approach fails to avoid a lowering of remanence.

In sintered Nd base magnets, the coercive force is given by the magnitude of an external magnetic field created by nuclei of reverse magnetic domains at grain boundaries. Creation of nuclei of reverse magnetic domains is largely dictated by the structure of the grain boundary in such a manner that any disorder of grain structure in proximity to the boundary invites a disturbance of magnetic structure, helping creation of reverse magnetic domains. It is generally believed that a magnetic structure extending from the grain boundary to a depth of about 5 nm contributes to an increase of coercive force (See K. D. Durst and H. Kronmuller, "THE COERCIVE FIELD OF SINTERED AND MELT-SPUN NdFeB MAGNETS," Journal of Magnetism and Magnetic Materials, 68 (1987), 63-75).

By concentrating trace Dy or Tb only in proximity to the grain boundaries to increase the anisotropic magnetic field only in proximity to the boundaries, the coercive force can be increased while suppressing any decline of remanence (see JP-B 5-31807). Subsequently, the inventors established a production method comprising separately preparing a $Nd_2Fe_{14}B$ compound composition alloy and a Dy or Tb-rich alloy, mixing them and sintering the mixture (see JP-A 5-21218). In this method, the Dy or Tb-rich alloy becomes a liquid phase during the sintering and is distributed so as to surround the $Nd_2Fe_{14}B$ compound. As a consequence, substitution of Dy or Tb for Nd occurs only in proximity to grain boundaries in the compound, so that the coercive force can be effectively increased while suppressing any decline of remanence.

However, since the two types of alloy fine powders in the mixed state are sintered at a temperature as high as 1,000 to 1,100° C., the above-described method has a likelihood that Dy or Tb diffuses not only to the boundaries, but also into the interior of $Nd_2Fe_{14}B$ grains. An observation of the structure of an actually produced magnet shows that Dy or Tb has diffused to a depth of about 1 to 2 μm from the boundary in a grain boundary surface layer, the diffused area reaching 60% or more, calculated as volume fraction. As the distance of diffusion into grains becomes longer, the concentration of Dy or Tb near the boundaries becomes lower. An effective measure for positively suppressing the excessive diffusion into grains is by lowering the sintering temperature. However, this measure cannot be practically acceptable because it compromises densification by sintering. An alternative method of sintering at lower temperatures while applying stresses by means of a hot press or the like enables densification, but poses the problem of extremely reduced productivity.

On the other hand, it is reported that coercive force can be increased by machining a sintered magnet to a small size, depositing Dy or Tb on the magnet surface by sputtering, and heat treating the magnet at a temperature lower than the sintering temperature, thereby causing Dy or Tb to diffuse only to grain boundaries (see K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000); and K. Machida, H. Kawasaki, T. Suzuki, M. Ito and T. Horikawa, "Grain Boundary Tailoring of Sintered Nd—Fe—B Magnets and Their Magnetic Properties," Proceedings of the 2004 Spring Meeting of the Powder & Powder Metallurgy Society, p. 202). These methods allow for more effective concentration of Dy or Tb at grain boundaries and succeed in increasing the coercive force without a substantial loss of remanence. As the magnet becomes larger in specific surface area, that is, the magnet body becomes smaller, the amount of Dy or Tb fed becomes larger, indicating that this method is applicable to only compact or thin magnets. However, there is still left the problem of poor productivity associated with the deposition of metal coating by sputtering or the like.

WO 2006/043348 discloses means for efficiently improving coercive force which has solved the foregoing problems and lends itself to mass-scale production. When a sintered $R^1$—Fe—B magnet body, typically sintered Nd base magnet body is heated in the presence of a powder on its surface, the powder comprising one or more of $R^2$ oxides, $R^3$ fluorides, and $R^4$ oxyfluorides wherein each of $R^1$ to $R^4$ is one or more elements selected from among rare earth elements inclusive of Y and Sc, $R^2$, $R^3$ or $R^4$ contained in the powder is absorbed in the magnet body, whereby coercive force is increased while significantly suppressing a decline of remanence. Particularly when $R^3$ fluoride or $R^4$ oxyfluoride is used, $R^3$ or $R^4$ is efficiently absorbed in the magnet body along with fluorine, resulting in a sintered magnet having a high remanence and a high coercive force.

Since the IPM rotary machine is structured such that magnets are disposed in bores in a steel plate laminate, it is superior in holding of magnets during high-speed rotation to the surface permanent magnet (SPM) rotary machine. In the IPM rotary machine, one of common countermeasures for eddy currents generated in magnets during high-speed rotation and heat generation thereby is to divide the magnet into magnet pieces and constitute a magnet segment from a plurality of magnet pieces. Also in this case, the magnetic field which is applied across the magnet from the stator during high-speed rotation of the motor is increased in frequency, and accordingly more eddy currents flow across the magnet. The eddy currents flow along the periphery of the magnet in order to prevent entry of a magnetic flux into the magnet, during which process heat generation occurs. It is thus desired to tailor that portion of the magnet to be more heat resistant.

CITATION LIST

Patent Document 1: JP-B H05-31807
Patent Document 2: JP-A H05-21218
Patent Document 3: WO 2006/043348
Non-Patent Document 1: K. D. Durst and H. Kronmuller, "THE COERCIVE FIELD OF SINTERED AND MELT-SPUN NdFeB MAGNETS," Journal of Magnetism and Magnetic Materials, 68 (1987), 63-75
Non-Patent Document 2: K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000)
Non-Patent Document 3: K. Machida, H. Kawasaki, T. Suzuki, M. Ito and T. Horikawa, "Grain Boundary Modification and Magnetic Properties of Nd—Fe—B Sintered Magnets," Proceedings of Spring Meeting of Japan Society of Powder and Powder Metallurgy, 2004, p. 202
Non-Patent Document 4: Yasuaki Aoyama and Koji Miyata, "Evaluation of Alternating magnetic Loss in Divided Nd—Fe—B Sintered Magnet," The Papers of Joint Technical Meeting on Static Apparatus and Rotating Machinery, The Institute of Electrical Engineers of Japan, SA-06-83 and RM-06-85, Aug. 25, 2006, p. 41-46

SUMMARY OF INVENTION

An object of the present invention is to provide a method for assembling a rotor for use in an IPM rotary machine having a high output and heat resistance.

Magnet segments used in the rotor of the IPM rotary machine are generally manufactured by a method as described below. First there are prepared small magnet pieces for constituting a magnet segment. Each magnet piece has three dimensions in axial, magnetization and width directions, which directions are so defined when a segment consisting of magnet pieces is disposed in the rotor. Specifically, each magnet piece has a dimension in an axial direction (the axis of rotation of the rotor) such that the total of the axial dimensions is substantially equal to the predetermined value when a plurality of magnet pieces are stacked to form the magnet segment, while the dimensions of the magnet piece in magnetization and width directions perpendicular to the axial direction are slightly greater than the predetermined values.

Next, the magnet pieces are bonded together to form a magnet segment. In this stage, offsets inevitably occur at the bond between magnet pieces, especially in magnetization and width directions perpendicular to the axial direction. This means that offsets occur even when the dimensions of magnet pieces in the magnetization and width directions are set equal to the dimensions of the completed segment, and then the dimensions of the magnet segment in the magnetization and width directions become greater than those of the magnet pieces. Then, the magnet segment as completed in this way cannot be inserted into a bore of the rotor yoke. It is then a common practice to pre-shape magnet pieces to slightly larger dimensions, to bond them to form a magnet segment, and to grind surfaces of the magnet segment, especially peripheral surfaces and optionally end surfaces of the magnet segment for thereby finishing the magnet segment to the final dimensions. In this case, since the initial magnet pieces are shaped larger than the finally necessary dimensions, an extra magnet material is necessary. Since the magnet pieces are machined two times, an increased machining cost is necessary.

Particularly when a treatment of letting a heavy rare earth element diffuse only in proximity to a surface of each magnet piece, that is, so-called grain boundary diffusion treatment is employed for enhancing coercive force and heat resistance, a problem arises that a subsurface region of the magnet piece where coercive force and heat resistance have been enhanced is in part abraded away by the finish grinding of the magnet segment into the final shape.

In connection with an interior permanent magnet (IPM) rotary machine comprising a rotor having an axis of rotation and comprising a rotor yoke having bores and a plurality of permanent magnet segments disposed in the bores of the rotor yoke, each permanent magnet segment consisting of a plurality of magnet pieces, the inventors have found that when the rotor is assembled by mounting a plurality of magnet pieces in the rotor bore, an improvement is made by inserting the plurality of magnet pieces in each bore of the rotor yoke, with the magnet pieces kept loose, that is, without binding the magnet pieces together such as by adhesive bonding, for thereby axially stacking the magnet pieces in the bore, and thereafter, fixedly securing the stacked magnet pieces in the bore. Then the dimensions of magnet pieces may be, from the first, equal to the corresponding dimensions of the magnet segment. This eliminates any loss of magnet material which is abraded away by finish grinding to the magnet segment, and also eliminates a need to grind the subsurface region where coercive force has been improved by grain boundary diffusion or similar treatment. As a result, a rotor having heat resistance is manufactured at a low cost.

Accordingly, in connection with an interior permanent magnet (IPM) rotary machine comprising a rotor having an axis of rotation and comprising a rotor yoke having bores and a plurality of permanent magnet segments disposed in the bores of the rotor yoke, each permanent magnet segment consisting of a plurality of magnet pieces, the present invention provides a method for assembling the rotor comprising the steps of:

inserting the plurality of magnet pieces in each bore of the rotor yoke, with the magnet pieces being kept loose from each other, for axially stacking the magnet pieces in the bore, and fixedly securing the stacked magnet pieces in the bore of the rotor yoke.

In a preferred embodiment, each magnet piece has a coercive force at a surface and an interior, and the coercive force near the surface of the magnet piece is higher than that in the interior of the magnet piece.

In another preferred embodiment, each magnet piece has heat resistance at a surface and an interior, and the heat resistance near the surface of the magnet piece is higher than that in the interior of the magnet piece.

In a further preferred embodiment, provided that each magnet piece has dimensions in axial, magnetization and width directions and each permanent magnet segment has a length in the axial direction, the axial dimension of the magnet piece is no more than ½ of the axial length of the permanent magnet segment and longer than the shorter one of the dimensions of the magnet piece in magnetization and width directions.

Typically the magnet pieces are of sintered Nd base rare earth magnet. Preferably each piece of sintered Nd base rare earth magnet has a coercive force profile from the surface toward the interior, which is created by letting Dy or Tb diffuse from the surface toward the interior of the magnet piece, more preferably mainly via grain boundaries. Also preferably, the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

In one embodiment, the magnet pieces have been magnetized in the step of inserting the plurality of magnet pieces in each bore of the rotor yoke for stacking the magnet pieces in the bore.

In another embodiment, the magnet pieces have not been magnetized in the step of inserting the plurality of magnet pieces in each bore of the rotor yoke for stacking the magnet pieces in the bore, and the method further comprises the step of applying a magnetic field across the stacked magnet pieces in the bore from without the rotor for magnetizing the magnet pieces.

In the IPM rotary machine using a plurality of permanent magnet segments, each permanent magnet segment is an assembly of two or more divided permanent magnet pieces. Better results are obtained when the discrete (or divided) permanent magnet pieces of the assembly are permanent magnet pieces having a coercive force and heat resistance at a surface and an interior such that the coercive force and heat resistance near the surface of the magnet piece are higher than those in the interior of the magnet piece.

In this regard, the methods of Machida et al. and WO 2006/043348 are suited for high-output rotary machines because of no loss of remanence, and since the coercive force near the surface of magnet pieces can be increased, the magnet pieces, when used in rotors of IPM rotary machines, are expected to minimize demagnetization due to heat generation by eddy currents. Then application of such a method to individual magnet pieces of the permanent magnet assembly is effective. After a sintered Nd base magnet is divided into pieces for minimizing the heat generation by eddy currents, the magnet pieces are effectively used as the magnet for a rotor in a permanent magnet rotary machine, typically IPM rotary machine. The magnet pieces in which the coercive force near their surface is higher than that in their interior, and in which heat resistance near their surface is improved are effective for use in a rotor in a permanent magnet rotary machine, typically IPM rotary machine.

When a permanent magnet rotary machine is loaded with magnet pieces into which a magnet block has been divided for minimizing the heat generation by eddy current, the magnet pieces show a locally elevated temperature near their surface due to eddy current heat generation. For enhancing the heat resistance of magnet, it is effective to increase the coercive force near the surface of magnet whose temperature becomes elevated. Particularly for enhancing the coercive force near the surface of magnet, it is effective to use a sintered Nd base magnet having a coercive force profile from the surface toward the interior that is created by letting Dy or Tb diffuse from the magnet surface toward the interior.

The diffusion of Dy or Tb from the surface toward the interior of magnet takes place mainly via grain boundaries. For example, the method of applying a Dy or Tb oxide powder, Dy or Tb fluoride powder or Dy or Tb-containing alloy powder to the magnet surface and letting Dy or Tb diffuse at a high temperature is effective as the diffusion reaction of Dy or Tb from the surface toward the interior of magnet.

ADVANTAGEOUS EFFECTS OF INVENTION

The invention is successful in providing a permanent magnet rotary machine having a high output and heat resistance since the rotor of the machine is loaded with a permanent magnet, typically a sintered Nd base magnet, which has been divided into magnet pieces having a high remanence and a high coercive force, especially at the outer periphery thereof, suited for use in rotors in IPM rotary machines. The invention eliminates the cumbersome step of grinding the magnet pieces after bonding, eliminates any loss of magnet material, and achieves a cost saving. When grain boundary diffusion or similar treatment has been applied to magnet pieces, the magnet pieces can be utilized as such without wasting the subsurface region of the magnet piece where coercive force is improved by the treatment.

BRIEF DESCRIPTION OF DRAWINGS

FIGS. 2A, 2B and 2C are cross-sectional views of exemplary magnet pieces which constitute a permanent magnet assembly in the IPM motor.

FIG. 3 illustrates one exemplary permanent magnet segment for use in the IPM motor according to the invention, FIG. 3A being a perspective view of a magnet piece which has undergone diffusion treatment with Dy or Tb from all surfaces, FIG. 3B being a perspective view of an assembly of such magnet pieces.

DESCRIPTION OF EMBODIMENTS

The invention pertains to an interior permanent magnet (IPM) rotary machine comprising a rotor having an axis of rotation and comprising a rotor yoke having bores and a plurality of permanent magnet segments disposed in the bores of the rotor yoke, each permanent magnet segment consisting of a plurality of magnet pieces. According to the method of the invention, the rotor is assembled by inserting the plurality of magnet pieces in each bore of the rotor yoke, with the magnet pieces being kept loose from each other, for axially stacking the magnet pieces in the bore and thereafter, securing the stacked magnet pieces in the bore.

Figure 1:
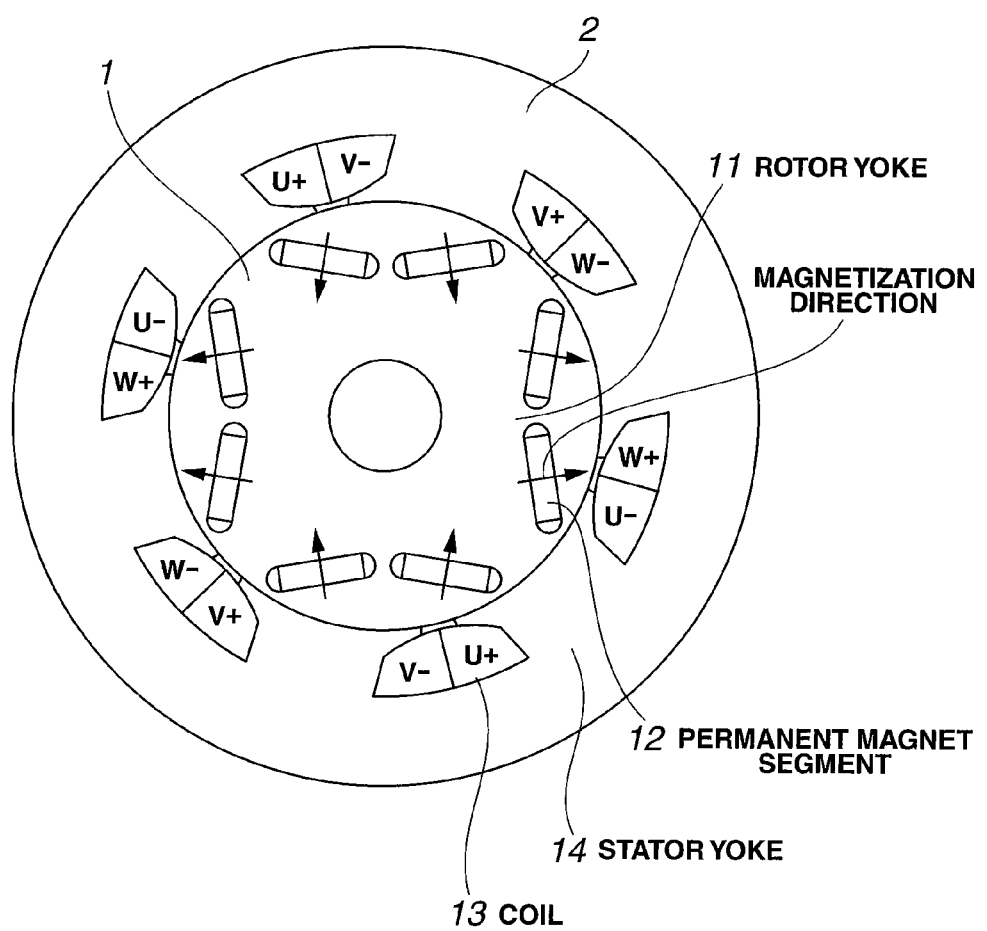
FIG. 1 is a cross-sectional view of one exemplary IPM motor of 4 poles/6 slots according to the invention.

FIG. 1 illustrates an exemplary IPM rotary machine. The machine in FIG. 1 includes a rotor 1 and a stator 2. The rotor 1 has a four-pole structure comprising a rotor yoke 11 of laminated magnetic steel sheets having bores 11a and a plurality of permanent magnet segments 12 disposed in the bores 11a (see also FIG. 9). Instead, simple rectangular magnet parts may be disposed at four poles. The number of poles is selected in accordance with a particular purpose of the rotary machine. The stator 2 has a six-slot structure of laminated magnetic steel sheets, with a coil 13 concentratedly wound on each teeth. The coil 13 is of a three-phase Y-connection of U, V and W phases. Also shown in FIG. 1 is a stator yoke 14. In FIG. 1, the symbols "+" and "−" attached to U, V and W indicate winding directions of coils, with "+" indicating a direction emerging from the plane of sheet and "−" indicating an entering direction. While the rotor and stator are positioned as shown in FIG. 1, an alternating current of cosine wave flows as the U phase, an alternating current having a 120° lead phase relative to the U phase flows as the V phase, and an alternating current having a 240° lead phase relative to the U phase flows as the W phase. Then the rotor rotates counter-clockwise by the interaction between the magnetic flux of permanent magnets and the magnetic flux of coils. In FIG. 1, the arrow associated with each permanent magnet segment 12 indicates a magnetization direction.

As used herein, the term "axial" direction refers to the axis of rotation of the rotor.

Figure 10:
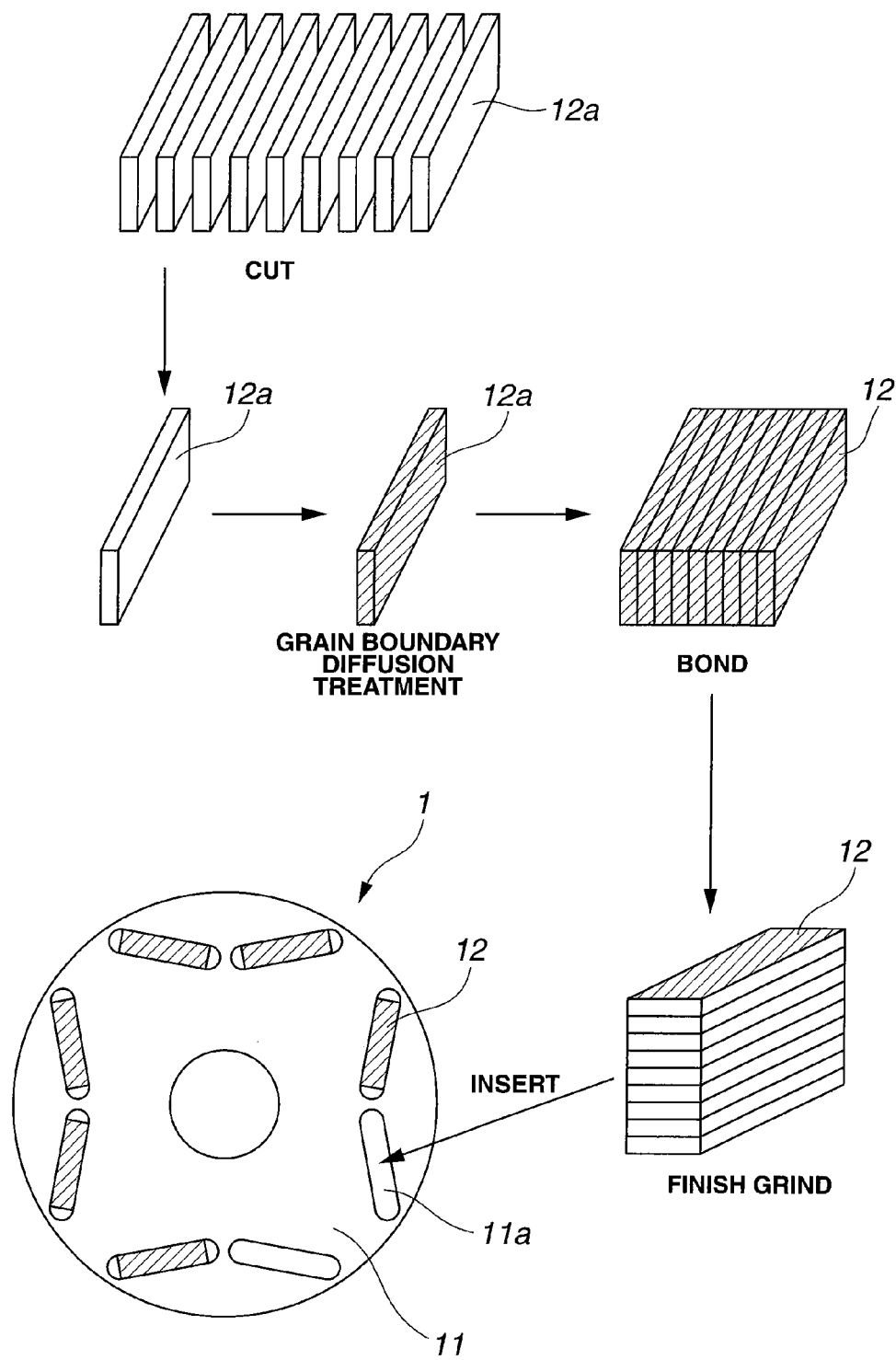
FIG. 10 illustrates in flow the prior art method of assembling a rotor.

It is now described how to mount permanent magnet segments in a rotor yoke. In a conventional procedure, as shown in FIG. 10, a magnet block is first cut into a plurality of magnet pieces 12a of predetermined dimensions. If necessary, magnet pieces 12a are treated for grain boundary diffusion, yielding grain boundary diffused magnet pieces 12a (treated surfaces depicted as shaded). A necessary number of magnet pieces 12a are secured together by bonding with an adhesive or the like, yielding an assembly of magnet pieces 12a which is a permanent magnet segment 12. Each magnet piece 12a has a first dimension in an axial direction (in alignment with the axis of rotation of the rotor 1 when magnet pieces 12a are disposed in the rotor 1) such that the total of the first dimensions is substantially equal to the predetermined value when a proper number of magnet pieces 12a are stacked to form the permanent magnet segment 12, and second and third dimensions in magnetization and width directions perpendicular to the axial direction which are slightly greater than the predetermined values. Then, in order to insert the permanent magnet segment 12 into a segment receiving bore 11a of the rotor yoke 11, the finish step of grinding surfaces of the permanent magnet segment 12 is taken. The permanent magnet segment 12 of dimensions which are reduced by a certain amount is inserted into the segment receiving bore 11a of the rotor yoke 11.

Figure 9:
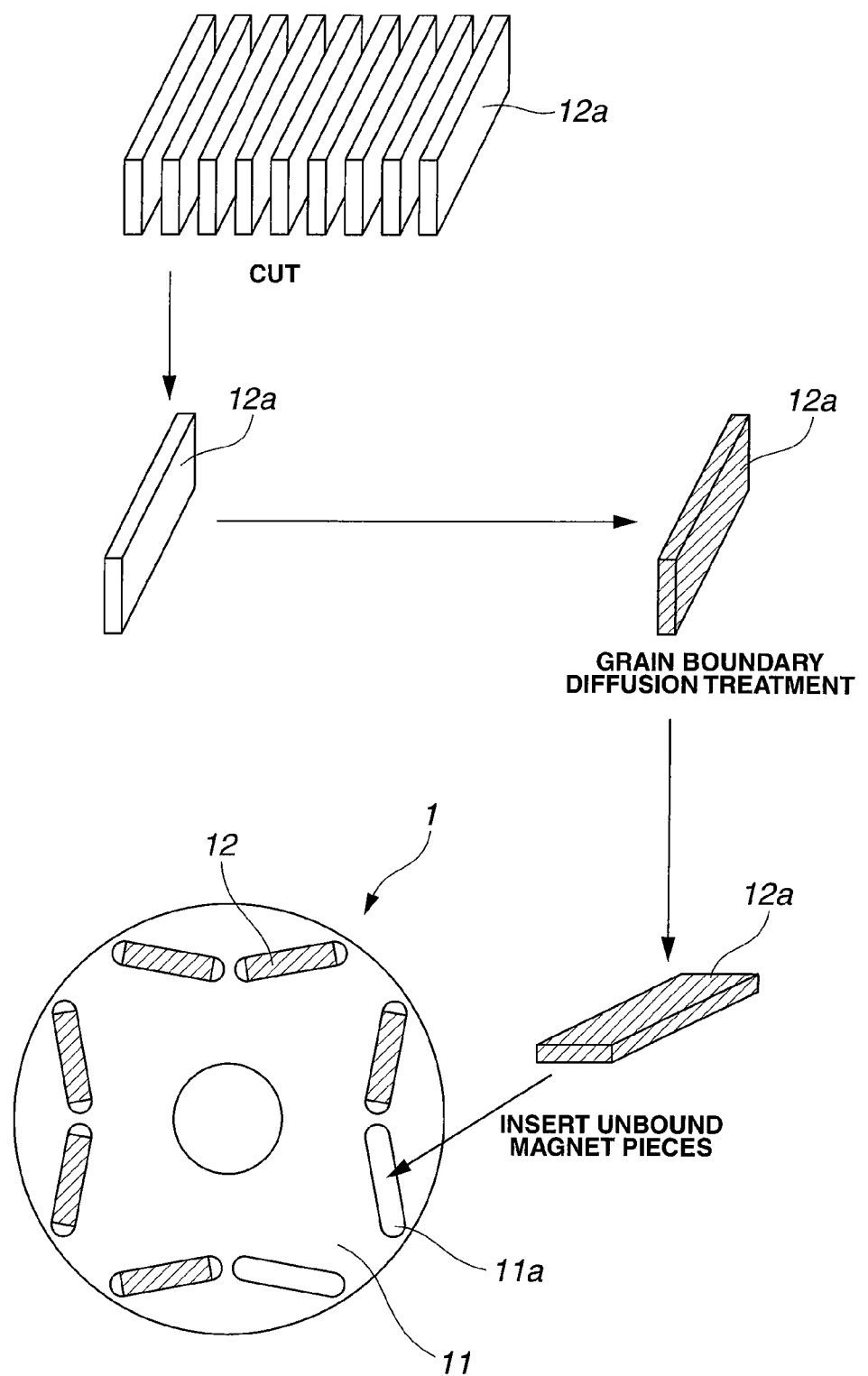
FIG. 9 illustrates in flow the method of assembling a rotor according to one embodiment of the invention.

As shown in FIG. 9, the method of the invention initially follows the same steps of cutting a magnet block into a plurality of magnet pieces 12a of predetermined dimensions and optionally effecting grain boundary diffusion treatment to yield grain boundary diffused magnet pieces 12a. Thereafter, a proper number of magnet pieces 12a are inserted in a segment receiving bore 11a of the rotor yoke 11, with the magnet pieces being kept loose from each other, for axially stacking the magnet pieces 12a in the bore 11a. Thereafter, the stacked magnet pieces 12a are fixedly secured in the bore 11a. In summary, a permanent magnet segment 12 is constructed within the segment receiving bore 11a by inserting a plurality of unbound magnet pieces 12a into the bore, then tightly binding the magnet pieces 12a in the bore to form an integral assembly of magnet pieces 12a.

Now that the permanent magnet segment 12 is constructed within the bore 11a as an assembly of magnet pieces 12a, the dimensions of initial magnet pieces may be the same as the dimensions of final magnet pieces to constitute the magnet segment. This eliminates any loss of magnet material which is abraded away by finish grinding to the magnet segment and avoids grinding of a subsurface region of the magnet piece having an improved coercive force due to grain boundary diffusion treatment. As a result, a rotor having improved heat resistance is manufactured at a low cost.

According to the invention, the permanent magnet segment 12 is an assembly of a plurality of divided permanent magnet pieces 12a as shown in FIG. 3B, for example.

The divided magnet pieces 12a are preferably of sintered Nd base rare earth magnet. The sintered Nd base rare earth magnet used herein may be obtained by coarsely pulverizing a mother alloy, finely pulverizing, compacting and sintering in a standard way. As mentioned above, the invention uses a discrete sintered magnet in which a coercive force or heat resistance near the surface thereof is higher than a coercive force or heat resistance in the interior thereof, which can be produced by letting Dy or Tb diffuse from the magnet surface toward the interior, and mainly via grain boundaries. More specifically, use is made of a magnet piece which is obtained by a procedure including depositing Dy or Tb on surfaces of a magnet piece by sputtering and heat treating the magnet piece at a temperature lower than the sintering temperature, thereby letting Dy or Tb diffuse only to grain boundaries, or another procedure including applying a powder of Dy or Tb oxide, fluoride or oxyfluoride to surfaces of a magnet piece and heat treating the magnet piece and powder in vacuum or inert gas at a temperature lower than the sintering temperature.

More preferably, the desired magnet piece may be obtained by applying a Dy or Tb oxide powder, Dy or Tb fluoride powder or Dy or Tb-containing alloy powder to surfaces of a magnet piece and then holding the magnet piece at a high temperature for letting Dy or Tb diffuse.

The permanent magnet (magnet piece) for use in the IPM rotary machine is obtained by machining a sintered magnet block into a predetermined shape using a grinding wheel, machining blade, wire saw or the like. The cross-sectional shape of the magnet piece is often a rectangular shape as shown in FIG. 2A from the standpoint of ease of working, although the magnet piece may be of a trapezoidal or arcuate shape as shown in FIG. 2B or 2C for the purpose of improving the performance of the rotary machine. It is noted that in FIG. 2, the arrow indicates a magnetization direction M.

It is noted that a parallelepiped magnet piece as shown in FIG. 3A, for example, has three dimensions L, T and W in an axial direction, magnetization direction M, and width (or longitudinal) direction, respectively, provided that the axial direction is defined with respect to the rotor having magnet piece assemblies disposed in the bores.

The size of a magnet piece is not particularly limited. For diffusion treatment of a magnet piece with Dy or Tb, the proportion of diffusion of Dy or Tb increases as the specific surface area of a magnet piece becomes larger, i.e., the size of a magnet piece becomes smaller. It is then preferred that in FIGS. 3A and 6A, the smallest one of dimensions W, L, and T is up to 50 mm, more preferably up to 30 mm, and most preferably up to 20 mm. The lower limit of this dimension is not critical although it is practically at least 0.1 mm.

Figure 8A:
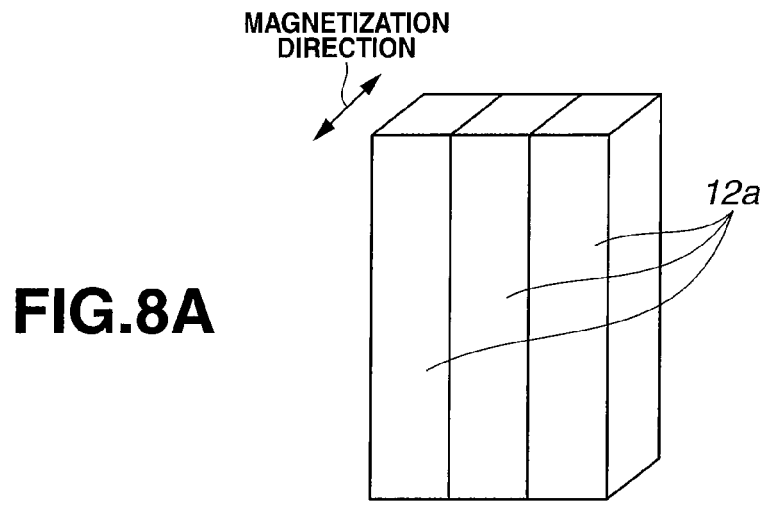
FIGS. 8A, 8B and 8C are perspective views of different permanent magnet assemblies.
Figure 8B:
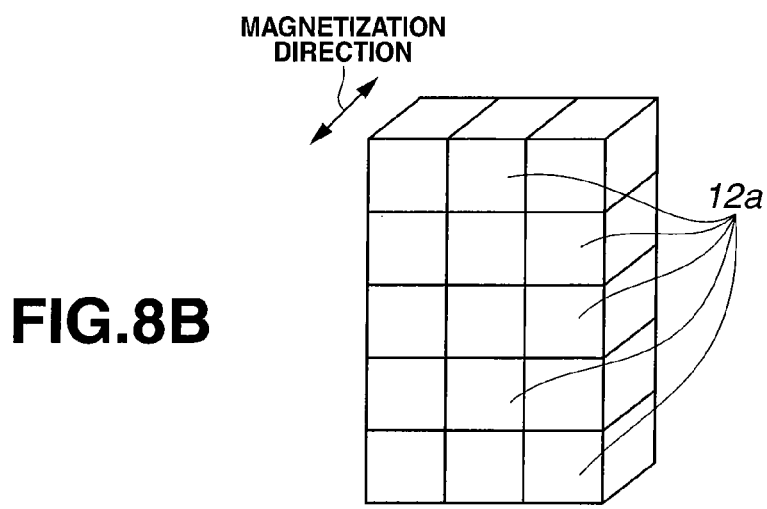
Figure 8C:
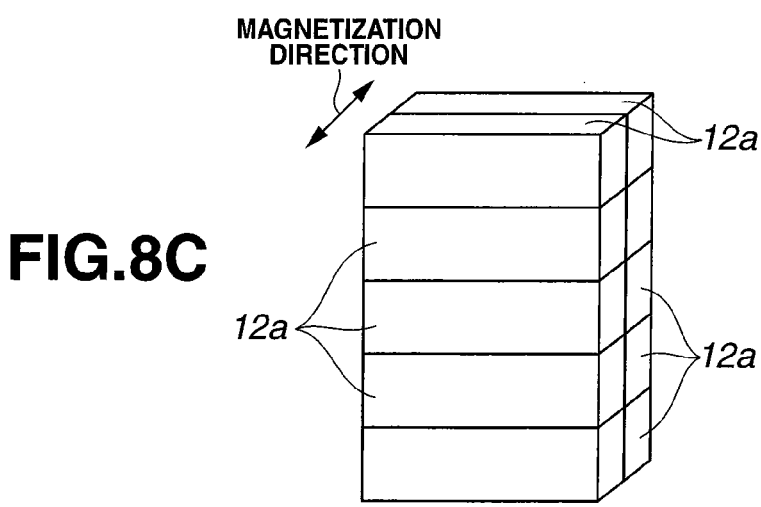

According to the invention, a starting magnet block is machined or cut into magnet pieces having the desired properties. The number of division of a permanent magnet segment is at least 2 pieces, preferably in the range of 2 to 50 pieces, and more preferably 4 to 25 pieces. The assembly may be any of various embodiments including an assembly constructed by stacking a plurality of magnet pieces 12a of parallelepiped or curved plate shape, with their longitudinal direction (W) aligned with a horizontal direction, as shown in FIGS. 3B and 6B; an assembly constructed by disposing magnet pieces 12a of parallelepiped shape with their longitudinal direction aligned with a vertical direction, juxtaposing a plurality of such magnet pieces in a row, and integrating them, as shown in FIG. 8A; an assembly constructed by stacking a plurality of magnet pieces 12a of cubic shape in a perpendicular direction, juxtaposing such stacks in a row in a transverse direction, and integrating them, as shown in FIG. 8B; and an assembly constructed by juxtaposing two stacks each consisting of magnet pieces of parallelepiped shape stacked as shown in FIG. 3B, and integrating them, as shown in FIG. 8C. The assembly is not limited to the illustrated embodiments.

In the IPM rotary machine, the magnetic flux passing across the permanent magnet varies momentarily with rotation of the rotor, and this variation of magnetic field causes eddy currents to generate within the magnet. Eddy currents flow in a plane perpendicular to the magnetization direction of the magnet.

Figures 5A, 5B:
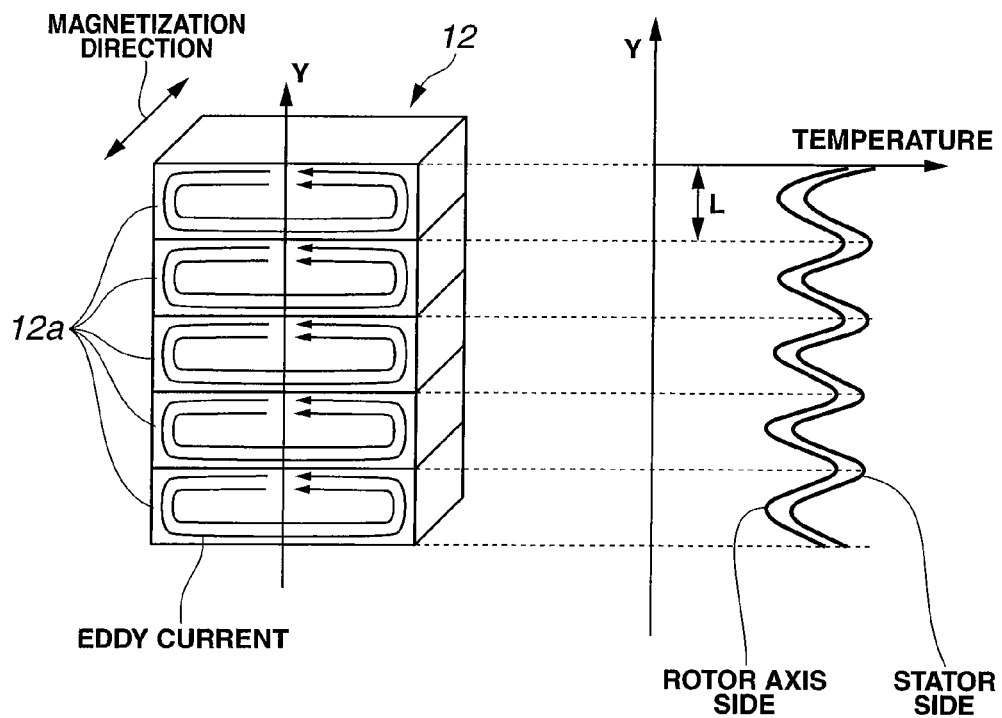
FIG. 5A illustrates how eddy currents flow in the permanent magnet assembly of FIG. 3B in an IPM motor.
FIG. 5B illustrates the temperature distribution within the magnet pieces in the assembly.

Even in the divided magnet piece 12a, eddy currents flow in a plane perpendicular to the magnetization direction. The flow of eddy currents and the temperature distribution within the magnet pieces are summarized in the schematic view of FIG. 5. As seen from FIG. 5, the density of eddy current becomes higher at an outer peripheral portion of each magnet piece where the temperature rises. Since the magnetic field variation is greater on the stator side, the temperature distribution in the magnetization direction is slightly higher on the stator side than on the rotor axis side. To suppress demagnetization due to eddy currents, an Nd magnet piece is required in which the coercive force (serving as an index of demagnetization resistance) is higher near the surface of the magnet piece corresponding to the magnet outer peripheral portion than in the magnet interior. The magnet interior where less heat is generated by eddy currents does not need a more than necessity coercive force.

FIG. 3 illustrates one embodiment. Dy or Tb is diffused from all surfaces of magnet piece 12a as shown in FIG. 3A (the shaded zones are surfaces from which Dy or Tb is diffused). Five magnet pieces 12a having a thus increased coercive force near the surface thereof are stacked (and finally adhesively bonded) into an assembly as shown in FIG. 3B.

Figure 6A:
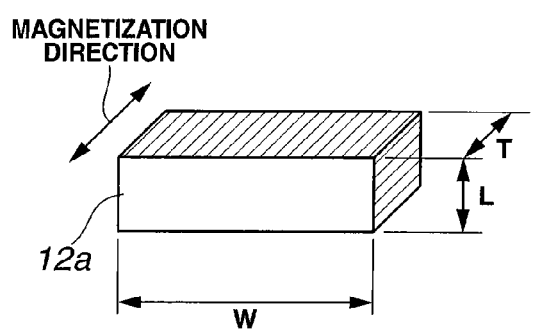
FIG. 6 illustrates another exemplary permanent magnet segment for use in the IPM motor according to the invention, FIG. 6A being a perspective view of a magnet piece which has undergone diffusion treatment with Dy or Tb from four surfaces parallel to the magnetization direction, FIG. 6B being a perspective view of an assembly of such magnet pieces.
Figure 6B:
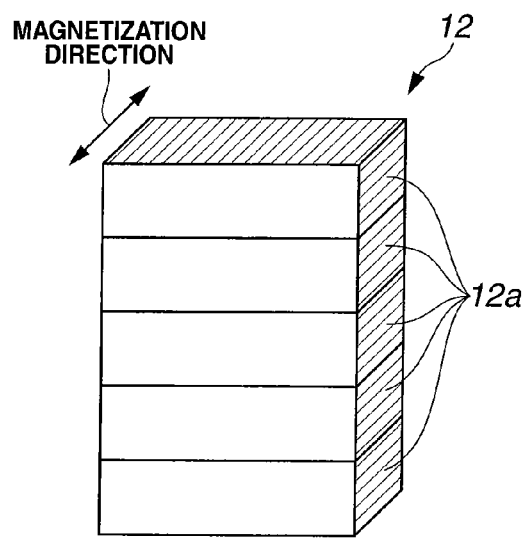
Figure 6B:
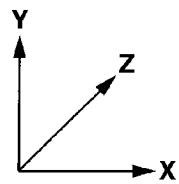

FIG. 6 illustrates another embodiment. Absorption/diffusion treatment with Dy or Tb is performed from four surfaces of magnet piece 12a which extend parallel to the magnetization direction as shown in FIG. 6A (the shaded zones are surfaces from which Dy or Tb is diffused, and two non-shaded zones in X-Y plane are untreated). Five magnet pieces 12a are stacked (and finally adhesively bonded) into an assembly as shown in FIG. 6B (the shaded zones are surfaces from which Dy or Tb is diffused). Even in the embodiment of FIG. 3 or 6, there are available Nd magnet pieces in which the coercive force (serving as an index of demagnetization resistance) is higher near the surface of the magnet piece corresponding to the magnet outer peripheral portion than in the magnet interior. As used herein, the term "near the surface" means a subsurface region which extends about 6 mm (at most) from the surface.

Figure 4A:
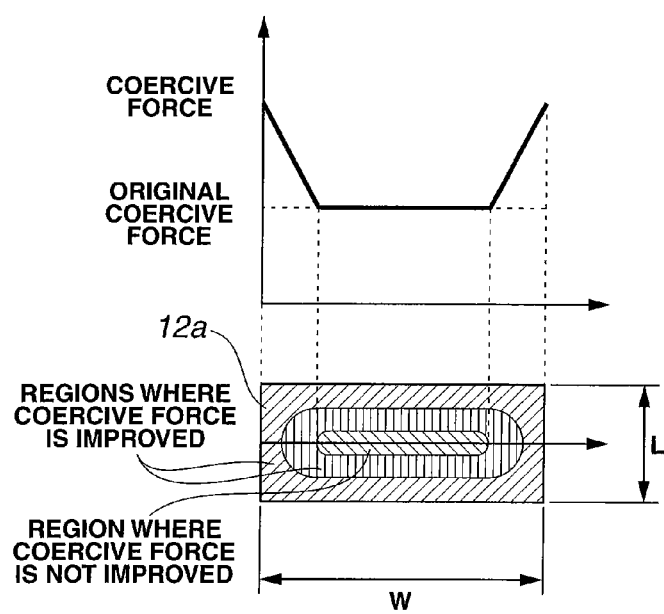
FIG. 4 illustrates the coercive force distribution in the magnet piece of FIG. 3A, FIG. 4A being in side surface, and FIG. 4B being in end surface.
Figure 4B:
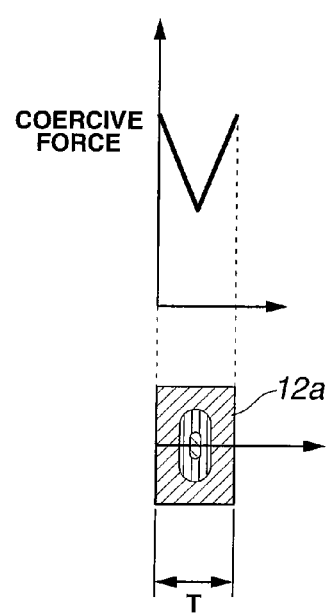
Figure 7A:
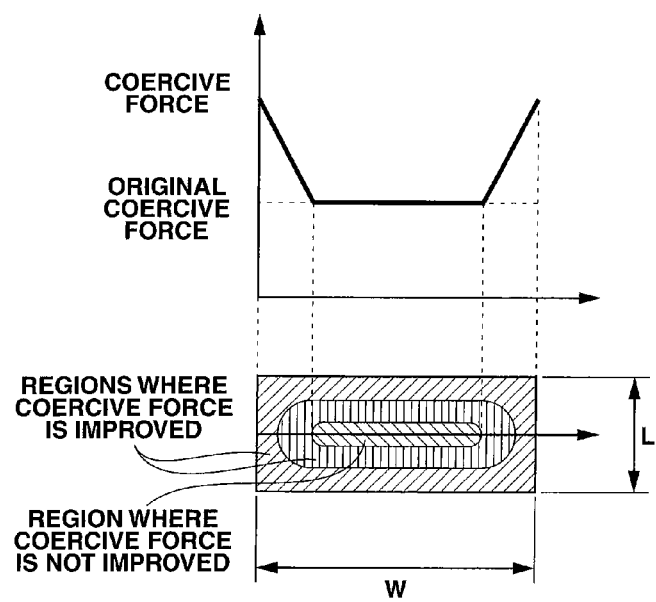
FIG. 7 illustrates the coercive force distribution in the magnet piece of FIG. 6A, FIG. 7A being in side surface, and FIG. 7B being in end surface.
Figure 7B:
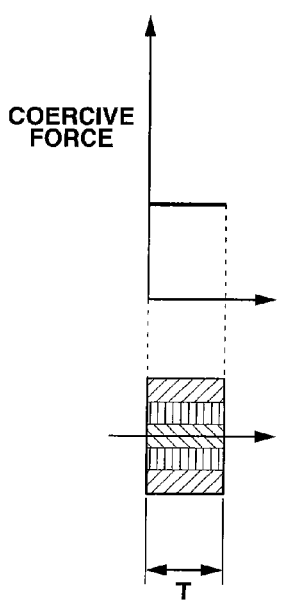

As a result of diffusion/absorption treatment with an element having an extraordinary effect of enhancing magnetocrystalline anisotropy, Dy or Tb from surfaces of a sintered Nd base magnet body, the coercive force of the sintered Nd base magnet is efficiently increased without a substantial loss of remanence. Thus the sintered magnet body has a coercive force distribution. FIG. 4 shows the coercive force distribution of a magnet piece which has undergone diffusion/absorption treatment from all surfaces thereof as shown in FIG. 3. The coercive force near the magnet surface is higher than that in the magnet interior. FIG. 7 shows the coercive force distribution of a magnet piece which has undergone diffusion/absorption treatment from four surfaces thereof parallel to the magnetization direction as shown in FIG. 6. The coercive force near the magnet surface is higher than that in the magnet interior, but the coercive forces near those surfaces perpendicular to the magnetization direction are not improved because of no diffusion/absorption from these surfaces. In the case of the IPM rotary machine, since the heat generation by eddy currents is especially high on those four surfaces (X-Z and Y-Z planes) parallel to the magnetization direction, even the coercive force distribution of FIG. 7 may improve heat resistance. Any of these embodiments is successful in increasing the coercive force near the magnet surface, providing a coercive force distribution effective for improving heat resistance against the heat generation by eddy currents.

Each magnet piece has a length (L in FIG. 3) in the axial direction and each permanent magnet segment has a length in the axial direction. In a preferred embodiment, the axial length L of each magnet piece is no more than ½ of the axial length of the permanent magnet segment and longer than a shorter one of the dimensions T and W of each magnet piece in magnetization and width directions. The reason is as follows. It is advantageous for reducing the influence of eddy currents that a permanent magnet segment is divided into two or more in a direction of the rotational axis of the rotor. However, if the division of a permanent magnet segment in the axial direction is too much, that is, the axial dimension of individual magnet pieces is too short, then it is difficult to keep the attitude of individual magnet pieces stable when they are inserted into the segment receiving bore of the rotor. Such a thin magnet piece tends to turn around and is difficult to insert into the bore of the rotor.

In the step of inserting magnet pieces into a segment receiving bore of the rotor, the magnet pieces may or may not have been magnetized. In one embodiment, magnetized magnet pieces are inserted and stacked in the bore. In another embodiment, non-magnetized magnet pieces may be inserted and stacked in the bore, and the stacked magnet pieces within the bore may be magnetized by applying a magnetic field from without the rotor. Magnetization may be done either before or after the stacked magnet pieces are secured together within the bore.

In the embodiment wherein magnetized magnet pieces are inserted and stacked in the segment receiving bore of the rotor, for example, the bore is provided with a nonmagnetic frame serving as a guide through which magnet pieces are inserted into the bore. Since the rotor is generally made of a magnetic material, typically steel sheet laminate, a magnet piece is stopped at the entrance of the bore due to magnetic attraction. Using a jack bolt or the like, the magnet piece is pushed inward from this point and located in place. A subsequent magnet piece may be similarly pushed inward using a jack bolt, although a magnetic reaction force with the previously inserted magnet piece may act.

The step of securing the stacked magnet pieces in the segment receiving bore may be performed in several ways. For example, the bore is previously coated with an adhesive before magnet pieces are inserted into the bore. Alternatively, an adhesive is applied to magnet pieces when they are inserted into the bore. After the magnet pieces are disposed in place, the adhesive is cured to secure the magnet pieces. Also effective is mechanical means of previously closing one opening of the segment receiving bore with a lid, and after insertion of magnet pieces, closing the other opening of the bore with a lid. A combination of adhesive with mechanical means is also acceptable.

EXAMPLE

Examples are given below for illustrating some embodiments of the present invention, but the scope of the invention is not limited thereby.

Example 1

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to an average particle size of 4 µm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all the surfaces into parallelepiped magnet pieces as shown in FIG. 3. These magnet pieces were dimensioned to L=5 mm, W=70 mm and T=20 mm (T in magnetic anisotropy direction). The machined magnet pieces were cleaned with an alkaline solution, pickled and dried. Steps of rinsing with deionized water were included before and after each cleaning step. The resultant parallelepiped magnet pieces are designated M1.

Next, dysprosium fluoride having an average particle size of 5 μm was mixed with ethanol at a weight fraction of 50%, in which the magnet pieces M1 were immersed for one minute with ultrasonic waves being applied. The magnet pieces were pulled up and immediately dried with hot air. At this point, the filling factor of dysprosium fluoride in the magnet surface-surrounding space was 45%. The magnet pieces were subjected to absorption treatment in an argon atmosphere at 900° C. for one hour, then to aging treatment at 500° C. for one hour, and quenched, obtaining magnet pieces M2.

Using the magnet pieces M2, a rotor for a four-pole IPM rotary machine was manufactured. The rotor had an outer diameter of 312 mm and a length of 90 mm, consisted of laminated 0.5 mm magnetic steel sheets, and was provided with bores for receiving permanent magnet segments. The segment receiving bore had an axial dimension of 90 mm capable of receiving 18 magnet pieces M2 (L=5 mm). After magnet pieces were inserted into the bore, the bore was filled with an epoxy resin adhesive, which was then cured for securing the magnet pieces together into an integral assembly. Finally the inlet of the bore was closed with a lid.

The rotor thus constructed was magnetized and then incorporated in a stator, constructing an IPM motor. Before and after the motor was operated at a load torque and a revolution two times the ratings, an induced electromotive force and heat resistance were determined. Since the induced electromotive force is an electromotive force produced by a magnetic field of magnet, a reduction of induced electromotive force is regarded as demagnetization of magnet. Additionally, the motor was placed in an oven, where the motor was operated in an environment at varying temperature. In this way, the motor was evaluated for heat resistance. The results are shown in Table 1.

Comparative Example 1

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to an average particle size of 4 μm. The resulting fine powder was compacted in a nitrogen atmosphere under a pressure of about 1 ton/cm² while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all the surfaces into parallelepiped magnet pieces as shown in FIG. 3. These magnet pieces were dimensioned to L=5 mm, W=71 mm and T=21 mm (T in magnetic anisotropy direction). The machined magnet pieces were cleaned with an alkaline solution, pickled and dried. Steps of rinsing with deionized water were included before and after each cleaning step. The resultant parallelepiped magnet pieces are designated P1.

Next, dysprosium fluoride having an average particle size of 5 μm was mixed with ethanol at a weight fraction of 50%, in which the magnet pieces P1 were immersed for one minute with ultrasonic waves being applied. The magnet pieces were pulled up and immediately dried with hot air. At this point, the filling factor of dysprosium fluoride in the magnet surface-surrounding space was 45%. The magnet pieces were subjected to absorption treatment in an argon atmosphere at 900° C. for one hour, then to aging treatment at 500° C. for one hour, and quenched, obtaining magnet pieces P2.

Eighteen (18) magnet pieces P2 were arranged in the direction of L and bonded together with an epoxy adhesive to form an integral parallelepiped assembly of magnet pieces, which had dimensions L=90.9 mm, W=72.2 mm and T=22.2 mm.

The assembly was then ground on all the surfaces into a parallelepiped permanent magnet segment having dimensions L=90 mm, W=70 mm and T=20 mm. Using these permanent magnet segments, a rotor (outer diameter 312 mm, length 90 mm) for a four-pole IPM rotary machine was manufactured. The rotor was magnetized and incorporated in a stator, constructing an IPM motor, which was tested as in Example 1. The results are also shown in Table 1.

TABLE 1

| | Material yield | Number of machining steps | Demagnetization incipient temperature |
|---|---|---|---|
| Example 1 | 78% | 1 | 188° C. |
| Comparative Example 1 | 73% | 2 | 182° C. |

As seen from Table 1, the IPM motor of Example 1 performed better than the motor of Comparative Example 1. Comparative Example 1 requires more machining and a more amount of magnet material to construct a rotor, and shows a lower material yield (a percentage of the mass of final magnet incorporated in a rotor relative to the mass of material used in magnet preparation). This proves that the invention contributes to a cost saving. Since Example 1 eliminated finish grinding so that a high coercivity subsurface region of magnet was not abraded away by grinding, the heat resistance of the IPM motor was improved by 6° C.

Japanese Patent Application No. 2009-229612 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for assembling a rotor used in connection with an interior permanent magnet (IPM) rotary machine, the rotor having an axis of rotation and comprising a rotor yoke having bores and a plurality of permanent magnet segments disposed in the bores of the rotor yoke, each of the plurality of permanent magnet segments consisting of a plurality of magnet pieces, the method comprising subsequent order steps of:

inserting and axially stacking the plurality of magnet pieces in each of the bores of the rotor yoke, each of the plurality of magnet pieces having a coercive force at a surface and an interior, and the coercive force near the surface of each of the plurality of magnet pieces being higher than that in the interior of each of the plurality of magnet pieces, with each of the plurality of magnet pieces being kept separate from each other prior to a step of fixedly securing the axially stacked plurality of magnet pieces to each other inside each of the bores of the rotor yoke to form each of said plurality of permanent magnet segments.

2. The method of claim 1 wherein provided that each of the plurality of magnet pieces has dimensions in axial, magnetization and width directions and each of said plurality of permanent magnet segments has a length in an axial direction, the axial dimension of each of the plurality of magnet pieces is no more than 1/2 of an axial length of each of the plurality of permanent magnet segments and longer than a shorter one of the dimensions of each of the plurality of magnet pieces in the magnetization and width directions.

3. The method of claim 1 wherein each of the plurality of magnet pieces is of sintered Nd base rare earth magnet.

4. The method of claim 1 wherein each of the plurality of magnet pieces is of sintered Nd base rare earth magnet and has a coercive force profile from a surface toward an interior, which is created by letting Dy or Tb diffuse from the surface toward the interior of each of the plurality of magnet pieces.

5. The method of claim 1 wherein each of the plurality of magnet pieces is of sintered Nd base rare earth magnet and has a coercive force profile from a surface toward an interior, which is created by letting Dy or Tb diffuse from the surface toward the interior of each of the plurality of magnet pieces mainly via grain boundaries.

6. The method of claim 1 wherein each of the plurality of magnet pieces have been magnetized in the step of inserting the plurality of magnet pieces in each bore of the rotor yoke for stacking the magnet pieces in the bore.

7. The method of claim 1 wherein each of the plurality of magnet pieces have not been magnetized in the step of inserting the plurality of magnet pieces in each of the bores of the rotor yoke for stacking the plurality of magnet pieces in the bore, the method further comprising the step of applying a magnetic field across the axially stacked plurality of magnet pieces in each of the bores from without the rotor for magnetizing the plurality of magnet pieces.

8. A method for assembling a rotor used in connection with an interior permanent magnet (IPM) rotary machine, the rotor having an axis of rotation and comprising a rotor yoke having bores and a plurality of permanent magnet segments disposed in the bores of the rotor yoke, each of the plurality of permanent magnet segments consisting of a plurality of magnet pieces, the method comprising subsequent order steps of:

inserting and axially stacking the plurality of magnet pieces in each of the bores of the rotor yoke, each of the plurality of magnet pieces having heat resistance at a surface and an interior, and the heat resistance near the surface of each of the plurality of magnet pieces being higher than that in the interior of each of the plurality of magnet pieces, with each of the plurality of magnet pieces being kept separate from each other prior to a step of fixedly securing the axially stacked plurality of magnet pieces to each other inside each of the bores of the rotor yoke to form each of said plurality of permanent magnet segments.

9. The method of claim 8 wherein provided that each of the plurality of magnet pieces has dimensions in axial, magnetization and width directions and each of said plurality of permanent magnet segments has a length in an axial direction, the axial dimension of each of the plurality of magnet pieces is no more than 1/2 of an axial length of each of the plurality of permanent magnet segments and longer than a shorter one of the dimensions of each of the plurality of magnet pieces in the magnetization and width directions.

10. The method of claim 8 wherein each of the plurality of magnet pieces is of sintered Nd base rare earth magnet.

11. The method of claim 8 wherein each of the plurality of magnet pieces is of sintered Nd base rare earth magnet and has a heat resistance profile from a surface toward an interior, which is created by letting Dy or Tb diffuse from the surface toward the interior of each of the plurality of magnet pieces.

12. The method of claim 8 wherein each of the plurality of magnet pieces is of sintered Nd base rare earth magnet and has a heat resistance profile from a surface toward an interior, which is created by letting Dy or Tb diffuse from the surface toward the interior of each of the plurality of magnet pieces mainly via grain boundaries.

13. The method of claim 8 wherein each of the plurality of magnet pieces have been magnetized in the step of inserting the plurality of magnet pieces in each bore of the rotor yoke for stacking the magnet pieces in the bore.

14. The method of claim 8 wherein each of the plurality of magnet pieces have not been magnetized in the step of inserting the plurality of magnet pieces in each of the bores of the rotor yoke for stacking the plurality of magnet pieces in the bore, the method further comprising the step of applying a magnetic field across the axially stacked plurality of magnet pieces in each of the bores from without the rotor for magnetizing the plurality of magnet pieces.

* * * * *